United States Patent

Johnson

Patent Number: 6,076,779
Date of Patent: Jun. 20, 2000

[54] CABLE GUIDING TROUGH

[75] Inventor: Brian L. Johnson, Maple Grove, Minn.

[73] Assignee: ADC Telecommunications, Inc., Minnetonka, Minn.

[21] Appl. No.: 09/366,814

[22] Filed: Aug. 4, 1999

[51] Int. Cl.[7] .................................. F16L 3/00; F16L 3/22
[52] U.S. Cl. ............................................. 248/49; 248/68.1
[58] Field of Search ....................... 248/49, 68.1; 174/95, 174/72 R, 68.1, 48, 49

[56] References Cited

U.S. PATENT DOCUMENTS

| | | | |
|---|---|---|---|
| 3,642,308 | 2/1972 | Zeile, Jr. et al. | 248/49 |
| 3,774,281 | 11/1973 | Eliason | 248/49 |
| 4,194,711 | 3/1980 | Winton | 248/49 |
| 4,905,939 | 3/1990 | Horn | 248/49 |

*Primary Examiner*—Ramon O. Ramirez
*Assistant Examiner*—Jerome A. DeLuca
*Attorney, Agent, or Firm*—Merchant & Gould P.C.

[57] ABSTRACT

A bendable cable trough section is provided having a U-shaped cross-section, such as for holding telecommunications cables. In one embodiment, alternating segments of rigid first sections and compressible second sections are provided. The first sections are preferably made of plastic. The second sections are preferably made of foam joined with adhesive to the first sections. Elongated strengthening members may be provided.

13 Claims, 13 Drawing Sheets

6,076,779

CABLE GUIDING TROUGH

FIELD OF THE INVENTION

This invention pertains to a system for the management and routing of cables, such as telecommunications cables. More particularly, this invention pertains to a trough section.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough members, fittings and couplings for routing the cables. U.S. Pat. Nos. 5,067,678; 5,316,243; and 5,752,781 show various cable routing systems.

When routing optical fibers, it is desirable that the routing system will be easy to install. For example, providing a continuous cable path throughout the system can be a challenge, such as when obstacles or misalignments arise during installation of the system. There is a need for devices which make system installation easier and less reliant on rigid and precisely aligned components.

SUMMARY OF THE INVENTION

The present invention concerns a bendable trough section for use in a trough system. The trough section includes at least one segment which permits bending of one end of the trough section relative to the other end so that the trough section does not define a linear path.

A preferred embodiment of the trough section in accordance with the present invention includes a trough body having first and second terminal ends, first and second upright walls extending between the first and second terminal ends, and a base wall between the first and second upright walls, extending between the first and second terminal ends. The first and second upright walls and the base wall define a generally U-shaped trough having an open top and a trough interior for receiving at least one telecommunications cable. The trough body further includes a plurality of first and second U-shaped members where the first U-shaped members have greater rigidity than the second U-shaped members. The first and second members are positioned in an alternating arrangement so as to define the bendable segment.

One preferred material for the second member is compressible foam. One preferred shape for the first member is a U-shaped plate portion. A preferred arrangement for maintaining the first and second members together is to use adhesive between the foam members and the plate portion. Elongated strengthening members may be positioned along the longitudinal direction of the trough section.

DETAILED DESCRIPTION OF THE PREFERRED EMBODIMENTS

Figure 1:
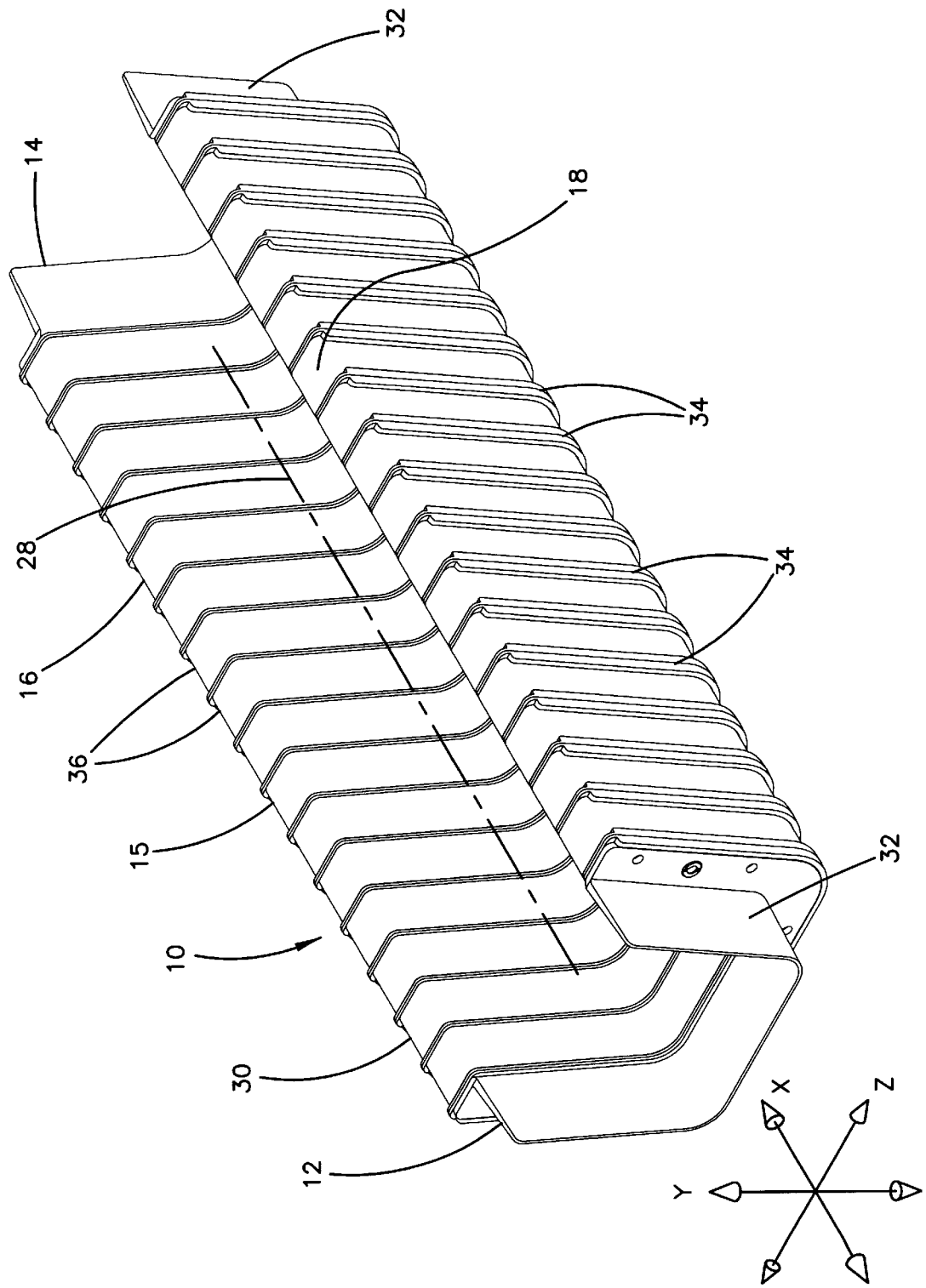
FIG. 1 is a perspective view of a preferred embodiment of a trough section in accordance with the present invention.
Figure 7:
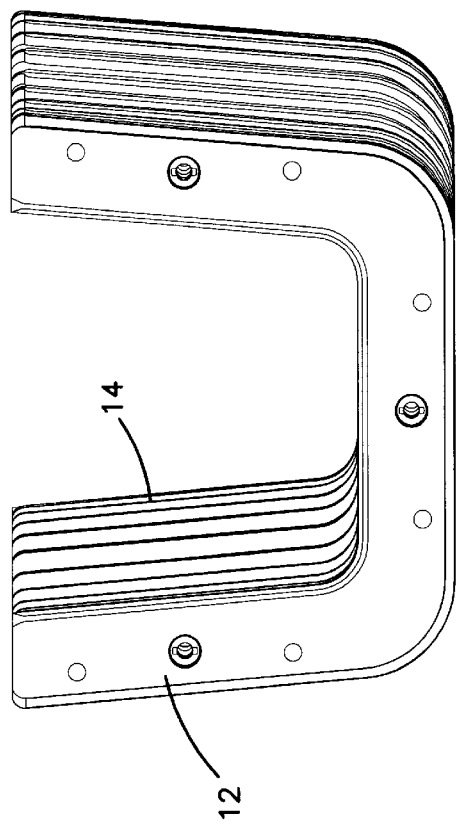
FIG. 7 is an end view of the trough section of FIG. 6.
Figure 2:
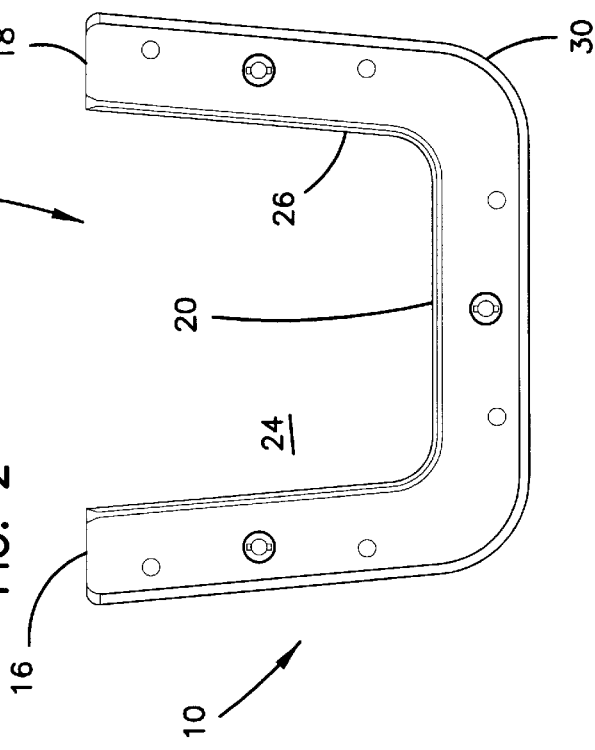
FIG. 2 is an end view of the trough section of FIG. 1.
Figure 3:
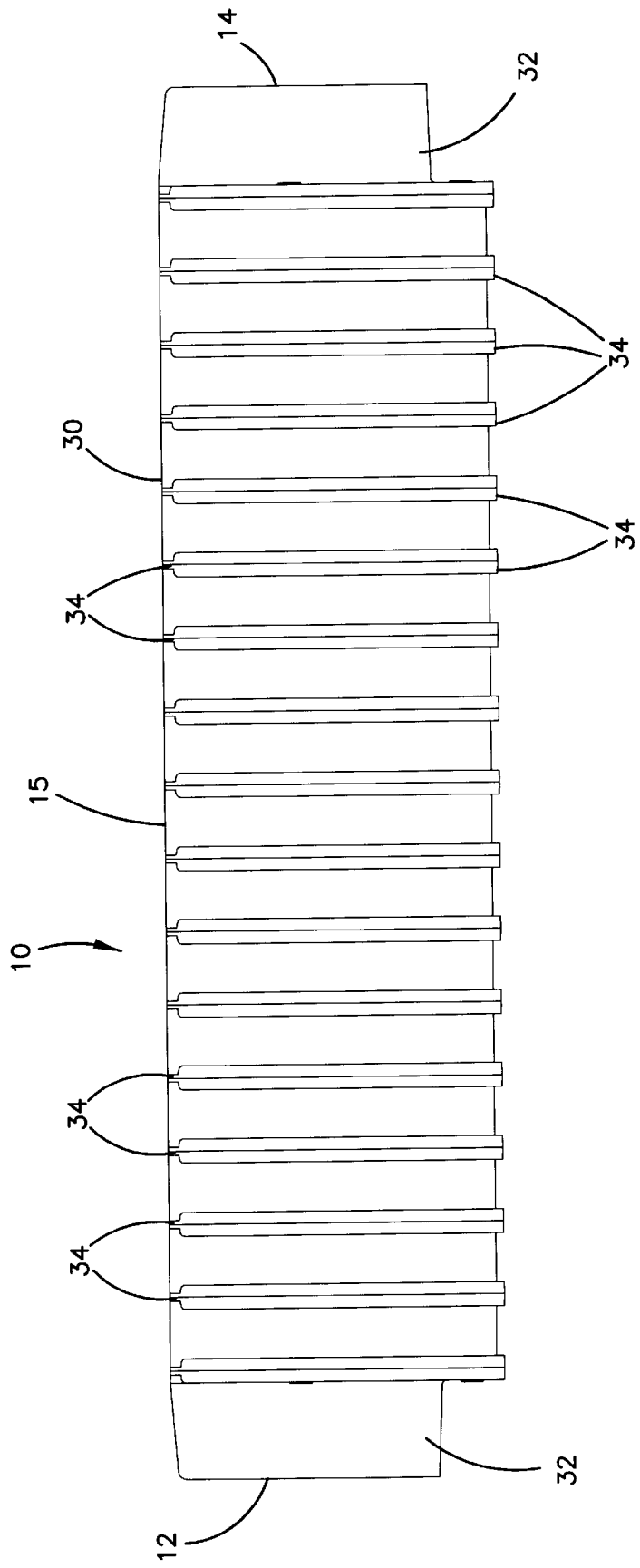
FIG. 3 is a side view of the trough section of FIG. 1.
Figure 4:
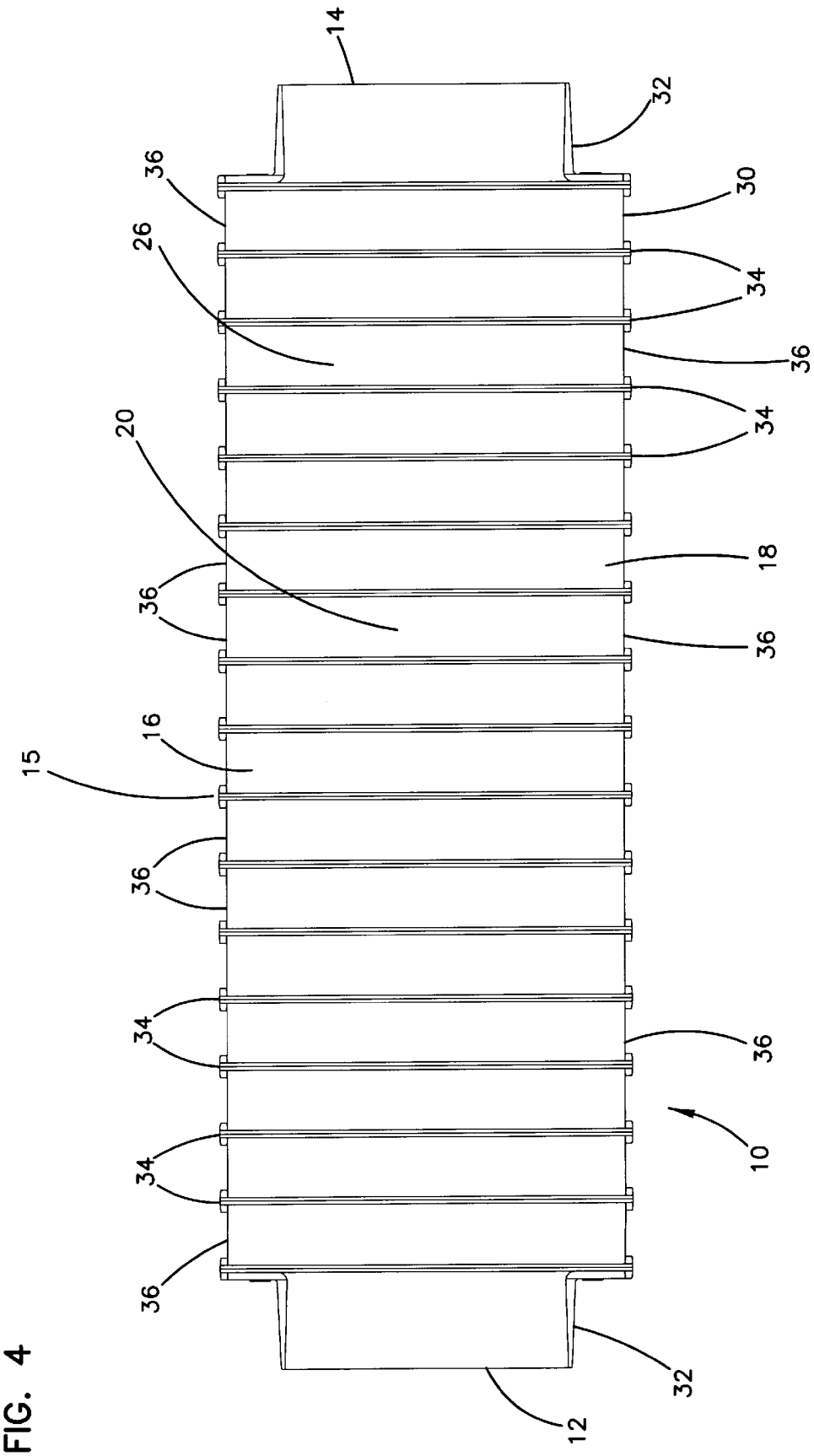
FIG. 4 is a top view of the trough section of FIG. 1.
Figure 5:
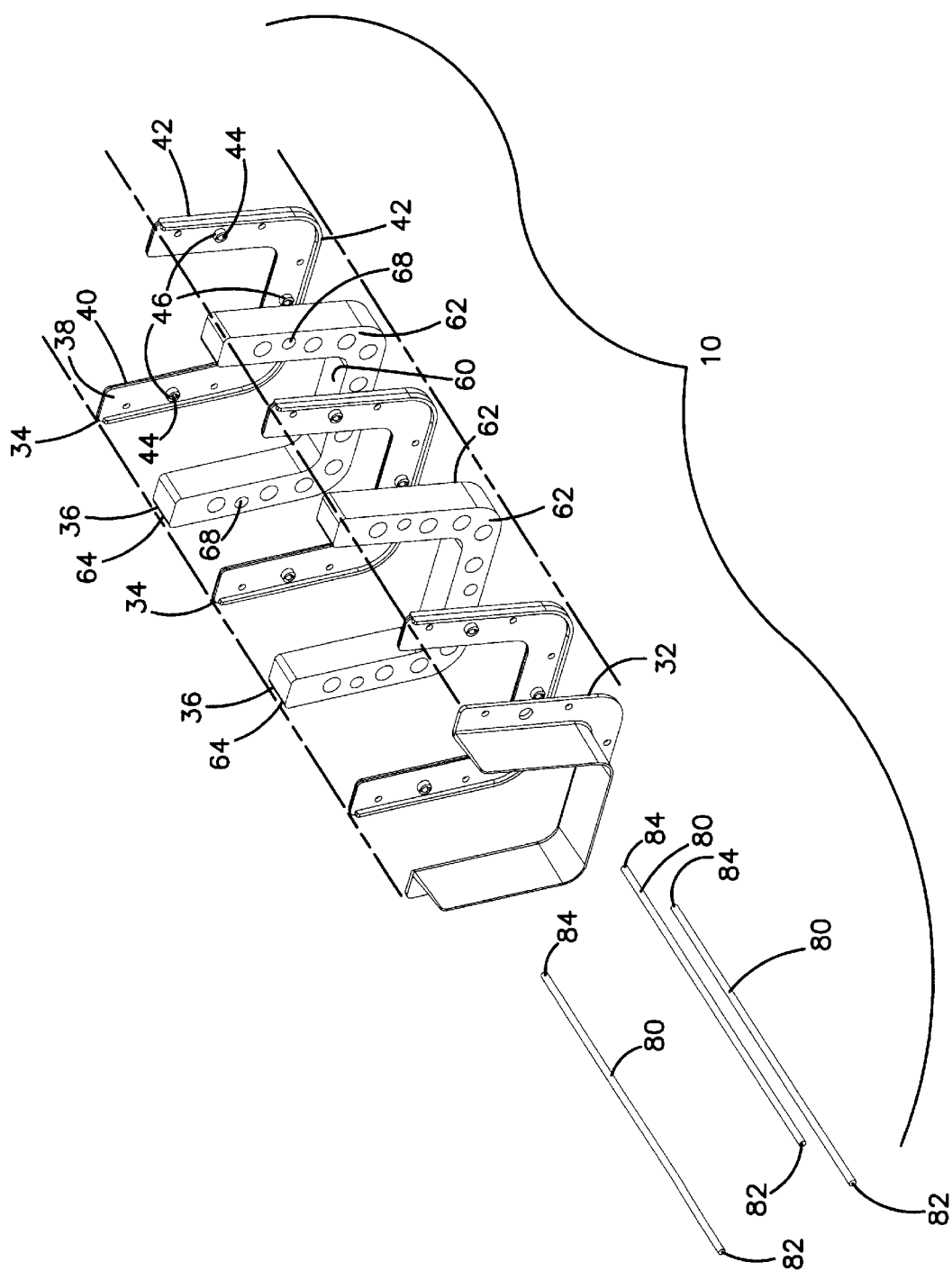
FIG. 5 is exploded perspective view of some of the individual components of the trot section of FIG. 1.
Figure 6:
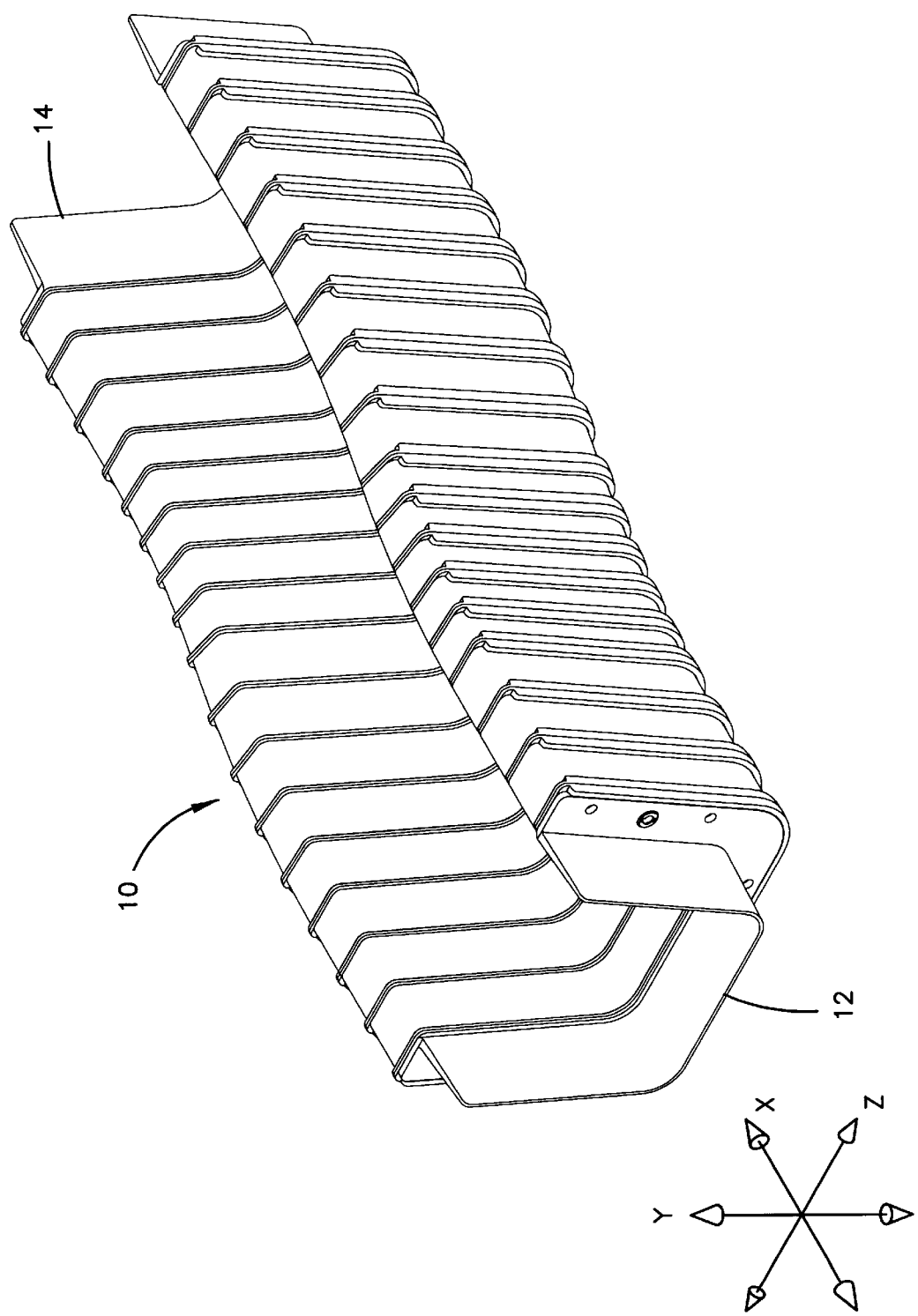
FIG. 6 is a perspective view of the trough section of FIG. 1, showing the trough section in a first orientation where the first and second terminal ends are not in alignment.
Figure 8:
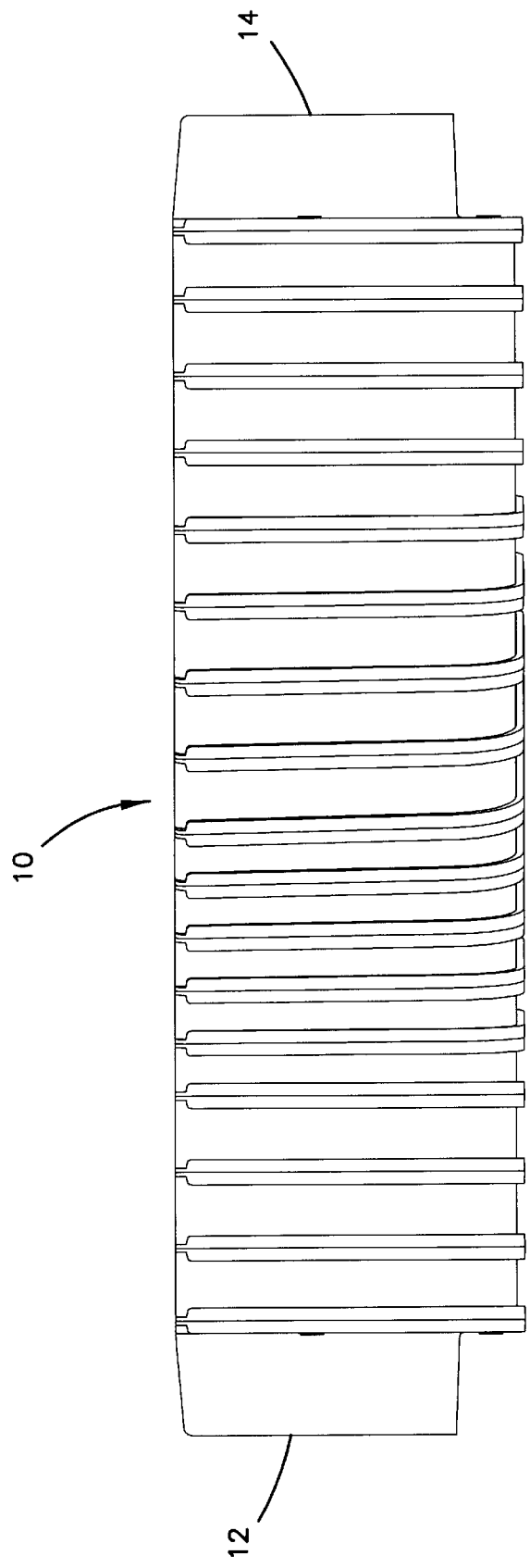
FIG. 8 is a side view of the trough section of FIG. 6.
Figure 9:
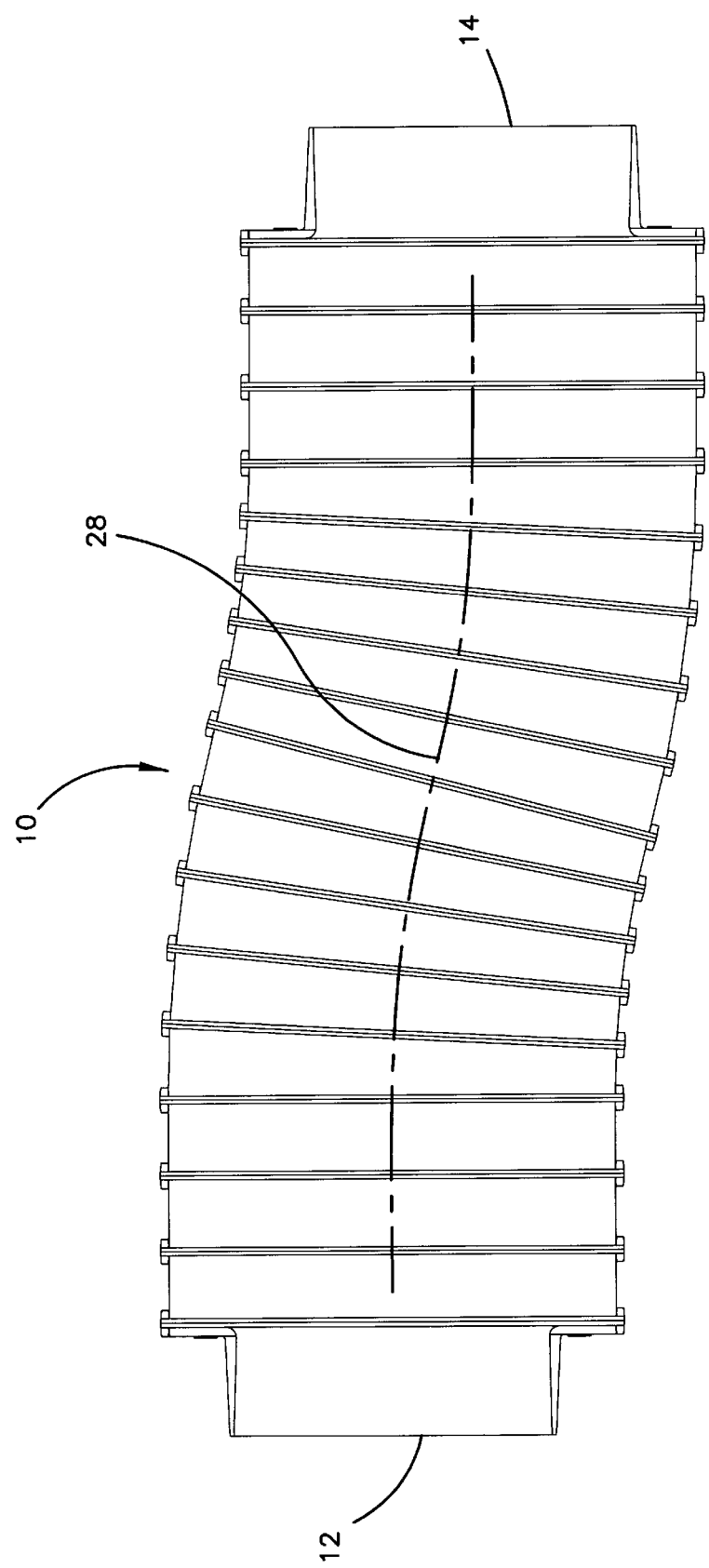
FIG. 9 is a top view of the trough section of FIG. 6.

The present invention concerns a selectively positionable trough section for use in a cable management system. The cable management system may include additional horizontal trough sections, vertical sections, junctions and couplings. The trough section of the present invention allows for use in cable management systems where the two ends of the trough section are not linearly aligned. Examples of situations where the ends are not linearly aligned include corrections of misalignments, and transitioning through offsets or directional changes. Also, the trough section of the present invention may be used for avoidance of obstacles where the ends are linearly aligned, but the adjoining section is circuitous.

Referring now to FIGS. 1–5, a trough member or trough section 10 is shown including terminal ends 12, 14 for connection to other cable management structures in a cable management system. Trough section 10 includes generally vertical or upright sidewalls 16, 18, and a connecting horizontal bottom wall 20. Trough section 10 defines an open top 22. A trough interior 24 receives one or more telecommunications cables. Trough section 10 generally has a U-shaped cross-section along center line 28. Preferably trough section 10 includes a continuous inside surface 26. In the case of optical fibers, a continuous inside surface 26 is desirable for protecting the optical fibers from damage. Trough section 10 includes a selectively positionable center section 15. In the illustrated embodiment, center section 15 is bendable or flexible.

As shown in FIG. 1, center line 28 is generally linear between terminal ends 12 and 14. Because trough section 10 is bendable between terminal ends 12, 14, the ends 12, 14 and center section 15 are positionable in a plurality of configurations. In the preferred embodiment, an infinite number of positions are provided.

Figure 10:
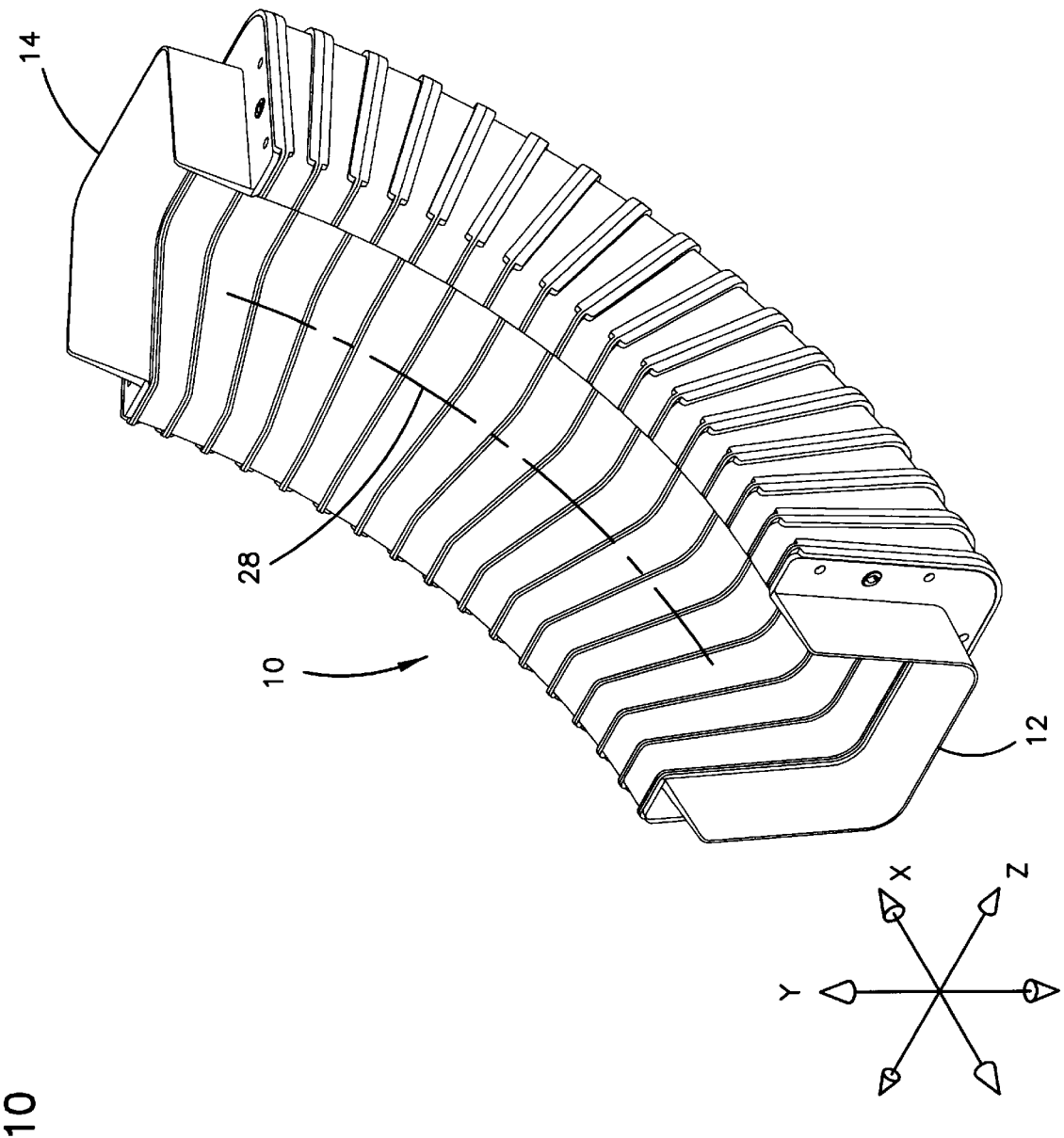
FIG. 10 is a perspective view of the trough section of FIG. 1, showing the trough section in a second orientation where the first and second terminal ends are not in alignment.
Figure 11:
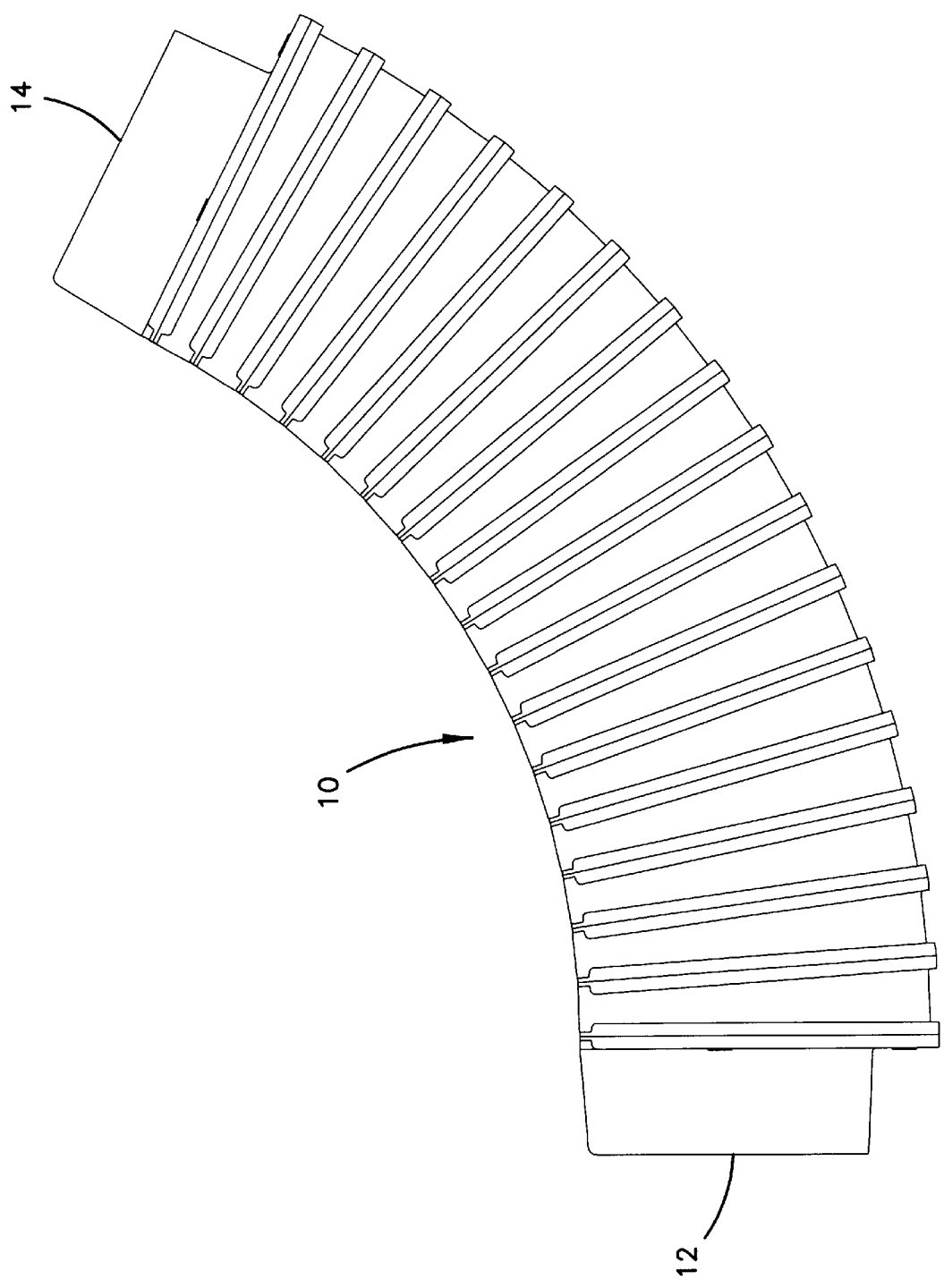
FIG. 11 is a side view of the trough section of FIG. 10.
Figure 12:
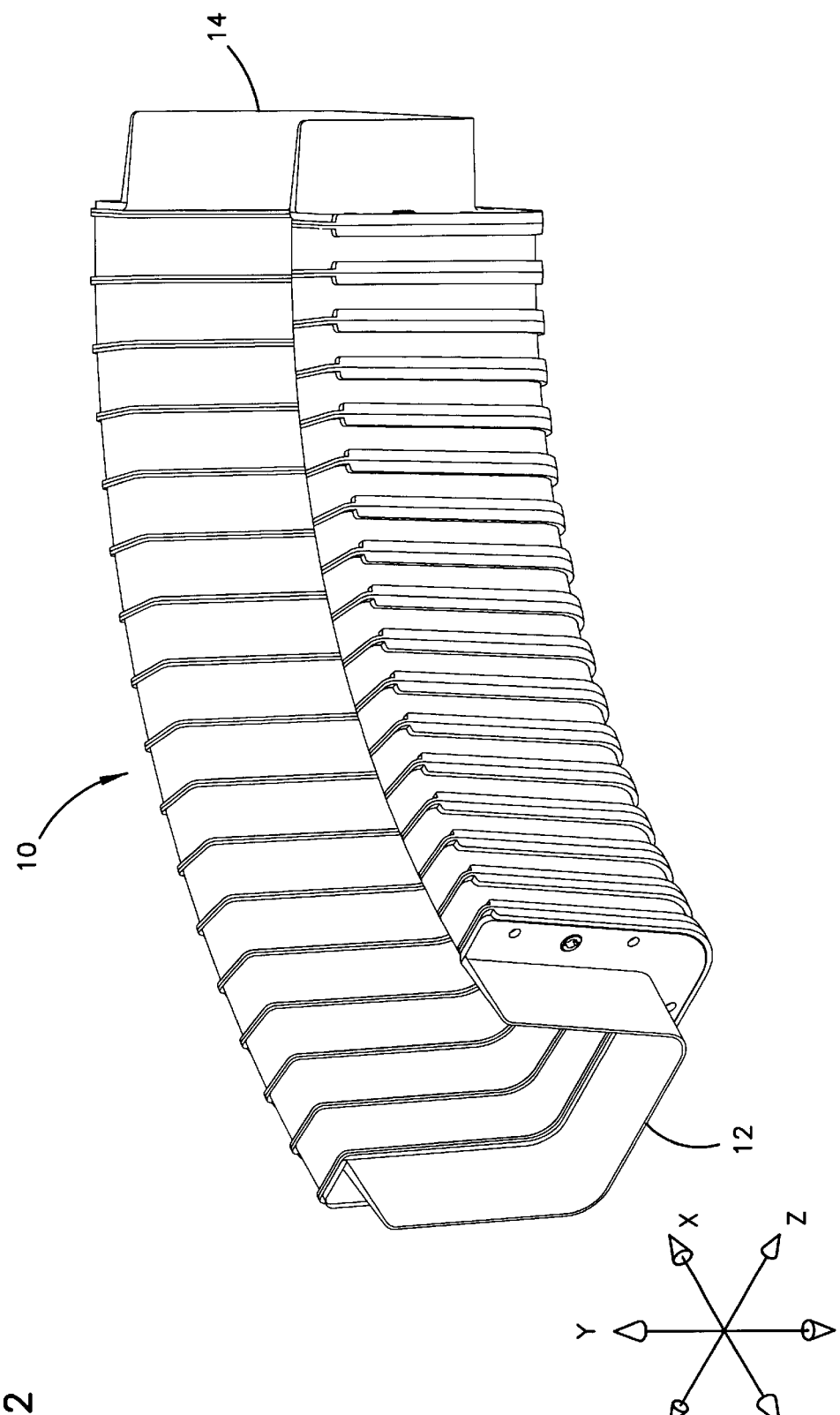
FIG. 12 is a perspective view of the trough section of FIG. 1, showing the trough section in a third orientation where the first and second terminal ends are not in alignment.
Figure 13:
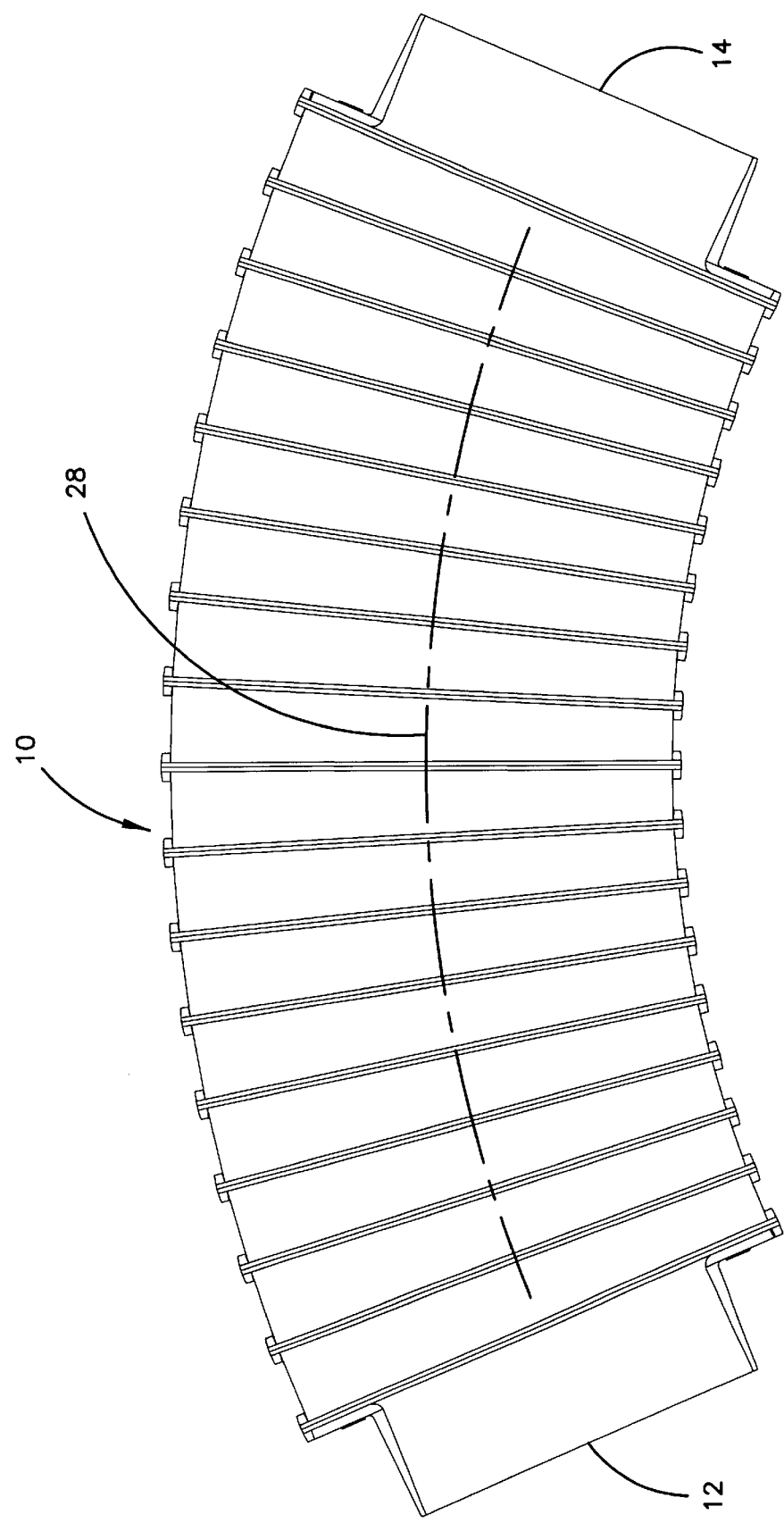
FIG. 13 is a top view of the trough section of FIG. 12.

Referring now to FIGS. 6–9, trough section 10 is shown where center line 28 is offset in the direction of the Z axis. Center line 28 follows an S path in FIGS. 6–9 in the X-Z plane. Referring now to FIGS. 10 and 11, trough section 10 bends generally upwardly in the direction of the Y axis between terminal ends 12, 14. Center line 28 has a generally C shape in the X-Y plane. Referring now to FIGS. 12 and 13, trough section 10 bends to the right horizontally in the direction of the Z axis, and center line 28 has a general C shape in the X-Z plane. Other positions for trough section 10 are possible. One further position not specifically illustrated but of potential use is where terminal ends 12, 14 are in the same general position along the Y axis, but an obstacle between terminal ends 12, 14 prevents a linear positioning of center line 28. In that instance, center portion 15 bows outwardly.

Referring again to FIGS. 1–5, trough section 10 includes a main body 30 including transition members 32 defining terminal ends 12, 14. Transition members 32 enable attachment to other system hardware where trough section 10 is used. Main body 30 includes at least one bendable portion between transition members 32.

Figure 14:
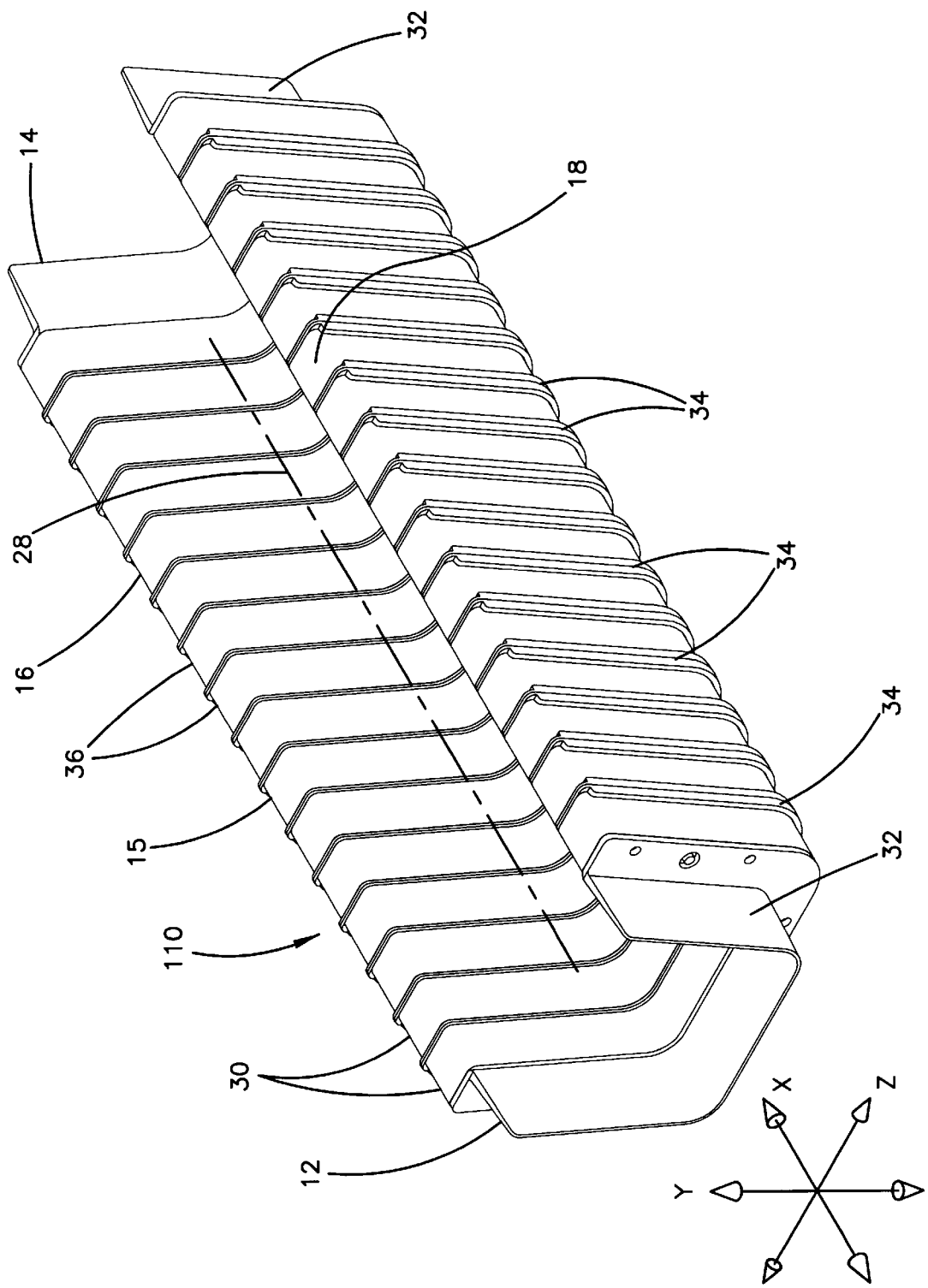
FIG. 14 is a perspective view of an alternative preferred embodiment of a trough section in accordance with the present invention.

In the illustrated embodiment, main body 30 includes alternating segments or sections 34, 36 between transition members 32 to form bendable center section 15. First section 34 preferably defines a rigid section including a U-shaped plate 38 defining a U-shaped inside surface 40. Outer lips 42 extend in the X axis direction from each side of plate 38. Preferably outer lips 42 define U shapes. Lips 42 provide for alignment surfaces during assembly for positioning of second sections 36 between first sections 34. An inner lip, like outer lip 42, can be provided instead of outer lip 42 or in addition to, on each side of plate 38. ts will be described further below, first sections 34 include a plurality of holes 44 extending in the X axis direction, and posts 46 which surround each hole 44. First sections 34 and transition members 32 can be made from molded plastic. An example plastic is ABS (acrylonitrile-butadiene-styrene). A first section 34 can be adjacent transition members 32 as shown in FIGS. 1–13. Alternatively, second sections 36 can be adjacent to transition members 32 as shown in FIG. 14.

Second sections 36 are less rigid than first sections 34. Second sections 36 are more compressible and expandable in the direction of center line 28 than more rigid first sections 34. Second sections 36 are preferably U-shaped, and include a U-shaped inside surfaced 60 which cooperates with U-shaped inside surface 40 of first section 34 to define continuous inside surface 26 of trough section 10. Second sections 36 further include end surfaces 62 which face toward plates 38. Adhesive or other attachment technique preferably joins end surfaces 62 of second sections 36 to plate 38 of each first section 34. In the preferred embodiment, pressure sensitive adhesive is used. Between end surfaces 62, second sections 36 include a compressible/expansible body 64, such as an elastomer. Foam is one preferred material. One example preferred material is neoprene foam rubber.

In the illustrated embodiments of trough section 10 in the bent orientations, body 64 has a different density within one or more second sections 36. As main body 30 is positioned in the bent orientations, the inner curved portion (under compression) has a higher density than the outer curved portion (under expansion).

Holes 68 of second sections 36 align with holes 44 of first sections 34 for receipt of elongated support members 80. Due to the flexible nature of trough section 10, elongated support members 80 are bendable with second sections 36. One example elongated support member 80 is a helical spring. Preferably, posts 46 are received within holes 68 as an alignment feature during assembly. If desired, first sections 34 can be linked by a spine, such as at a base of the U-shape.

As shown in FIGS. 6–13, second sections 36 allow for the cable pathway between the ends 12,14 of trough section 10 to be non-linear, such as to correct for misalignments, or to transition through offsets. The second sections 36 also allow for avoidance of obstacles, such as a pipe, where trough section 10 could travel up and over, the back down around the pipe to link two horizontal trough sections.

The above specification and examples provide a complete description of the manufacture and use of the invention. Since many embodiments of the invention can be made without departing from the spirit and scope of the invention, the invention resides in the claims hereinafter appended.

What is claimed is:

1. A cable trough section comprising:
   a) a trough body defining:
      (1) first and second terminal ends;
      (2) first and second upright walls extending between the first and second terminal ends;
      (3) a base wall between the first and second upright walls, extending between the first and second terminal ends;
      (4) the first and second upright walls and the base wall defining a generally U-shaped trough having an open top and a trough interior for receiving at least one telecommunications cable;
   b) the trough body which defines the generally U-shaped trough including a section having:
      (1) a plurality of first and second U-shaped members;
      (2) the first U-shaped member having a first rigidity;
      (3) the second U-shaped member having a second rigidity less than the first rigidity;
      (4) each second U-shaped member including a compressible body;
      (5) the first and second U-shaped members positioned in an alternating arrangement;
   c) wherein the trough body includes a bendable section defined by the alternating arrangement of the first and second U-shaped members.

2. The cable trough section of claim 1, wherein the first U-shaped member includes a main plate section and a lip on each side of the plate section.

3. The cable trough section of claim 2, further comprising an elongated strengthening member extending between the first and second terminal ends.

4. The cable trough section of claim 2, wherein the second U-shaped member is comprised of foam, and further comprising adhesive between the second U-shaped member and the main plate section.

5. The cable trough section of claim 4, further comprising an elongated strengthening member extending between the first and second terminal ends.

6. The cable trough section of claim 1, wherein the second U-shaped member is comprised of foam.

7. The cable trough section of claim 1, further comprising an elongated strengthening member extending between the first and second terminal ends.

8. A cable trough section comprising:
   a) a trough body defining:
      (1) first and second terminal ends;
      (2) first and second upright walls extending between the first and second terminal ends;
      (3) a base wall between the first and second upright walls, extending between the first and second terminal ends;
      (4) the first and second upright walls and the base wall defining a generally U-shaped trough having an open top and a trough interior for receiving at least one telecommunications cable;

b) the trough body which defines the generally U-shaped trough including a section having:
(1) first and second portions;
(2) a selectively positionable section made of foam between the first and second portions so that the selectively positionable sect on is positionable wherein the trough interior is not linear between the first and second terminal ends.

9. The cable trough section of claim 8, further comprising an elongated strengthening member extending between the first and second terminal ends.

10. The cable trough section of claim 8, further comprising a plurality of segments of the foam each separated by one of a plurality of segments of plastic, each of the segments of foam and the segments of plastic having a U-shape.

11. A cable trough section comprising:

a) a trough body defining:
(1) first and second terminal ends;
(2) first and second upright walls extending between the first and second terminal ends;
(3) a base wall between the first and second upright walls, extending between the first and second terminal ends;
(4) the first and second upright walls and the base wall defining a generally U-shaped trough having an open top and a trough interior for receiving at least one telecommunications cable;

b) the trough body which defines the generally U-shaped trough including a section having:
(1) a selectively positionable section having a compressible body so that the selectively positionable section is positionable wherein the trough interior is not linear in the longitudinal direction between the first and second terminal ends.

12. The cable trough section of claim 11, wherein the density of the compressible body varies within at least one longitudinal cross-section.

13. The cable trough section of claim 11, wherein the compressible body includes foam.

* * * * *

UNITED STATES PATENT AND TRADEMARK OFFICE
CERTIFICATE OF CORRECTION

PATENT NO. : 6,076,779
DATED : June 20, 2000
INVENTOR(S) : Johnson

It is certified that error appears in the above-identified patent and that said Letters Patent is hereby corrected as shown below:

Title page,
[56] References Cited, U.S. Patent Documents, in appropriate order, please insert:

| | | |
|---|---|---|
| -- 5,067,678 | 11/1991 | Henneberger et al. |
| 5,160,811 | 11/1992 | Ritzmann |
| 5,161,580 | 11/1992 | Klug |
| 5,240,209 | 8/1993 | Kutsch |
| 5,271,585 | 12/1993 | Zetena, Jr. |
| 5,316,243 | 5/1994 | Henneberger |
| 5,335,349 | 8/1994 | Kutch et al. |
| 5,339,379 | 8/1994 | Kutch et al. |
| 5,503,354 | 4/1996 | Lohf et al. |
| 5,740,994 | 4/1998 | Laughlin |
| 5,752,781 | 5/1998 | Haataja et al. |
| 5,893,702 | 11/1998 | Jette -- |

[56] References Cited, Publications: insert -- Specifier's Guide entitled "Electrical Electronic Enclosures & Equipment, Hoffman Engineering Company, two pages, dated February, 1998. --

Signed and Sealed this

Eighteenth Day of September, 2001

Attest:

NICHOLAS P. GODICI
*Attesting Officer*  *Acting Director of the United States Patent and Trademark Office*